(12) United States Patent
Zeng et al.

(10) Patent No.: US 7,560,916 B2
(45) Date of Patent: Jul. 14, 2009

(54) VOLTAGE-LOCKED LOOP

(75) Inventors: James Zeng, Cupertino, CA (US);
Sridhar Kotikalapoodi, Santa Clara, CA (US); Farzan Roohparvar, Monte Sereno, CA (US)

(73) Assignee: Broadcom Corporation, Irvine, CA (US)

( * ) Notice: Subject to any disclaimer, the term of this patent is extended or adjusted under 35 U.S.C. 154(b) by 319 days.

(21) Appl. No.: 11/335,115

(22) Filed: Jan. 19, 2006

(65) Prior Publication Data
US 2007/0164715 A1 Jul. 19, 2007

(51) Int. Cl.
G05F 1/40 (2006.01)
G05F 1/565 (2006.01)
(52) U.S. Cl. ..................... 323/283; 323/275
(58) Field of Classification Search .............. 323/266, 323/268, 270, 271, 273–275, 282–285
See application file for complete search history.

(56) References Cited

U.S. PATENT DOCUMENTS 5,625,279 A * 4/1997 Rice et al. .................. 323/283
6,057,675 A * 5/2000 Tateishi ...................... 323/283
7,061,213 B2 * 6/2006 Yoshida ...................... 323/224
7,148,670 B2 * 12/2006 Inn et al. .................... 323/283

* cited by examiner

Primary Examiner—Matthew V Nguyen
(74) Attorney, Agent, or Firm—McAndrews, Held & Malloy, Ltd.

(57) ABSTRACT

A system and method providing output voltage control in a power supply circuit. Various aspects of the present invention may comprise at least a first module adapted to receive an input DC voltage and at least one voltage control signal and output an output DC voltage that is a function of the input DC voltage and the voltage control signal. At least a second module may be adapted to receive a feedback signal representative of the output DC voltage and output the at least one voltage control signal as a function of at least the feedback signal. The second module may, for example, be a digital module adapted to generate the at least one voltage control signal utilizing digital active components. The second module may also, for example, utilize transistors and/or passive components controlled by the digital active components to generate the at least one voltage control signal.

22 Claims, 6 Drawing Sheets

VOLTAGE-LOCKED LOOP

BACKGROUND OF THE INVENTION

The use of power supply circuitry (e.g., DC-DC converter circuitry) is wide spread. Power supply circuitry typically utilizes control circuitry to control the output voltage of the power supply circuitry. For example, typical power supply circuitry might utilize any of a variety of analog active and passive components to generate control signals designed to control the output voltage of the power supply circuitry. The operation of typical power supply circuitry might, for example and without limitation, be adversely impacted by electrical noise, temperature variation, relatively low bandwidth, complex circuit architecture, limited design flexibility, etc.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method providing output voltage control in a power supply circuit, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
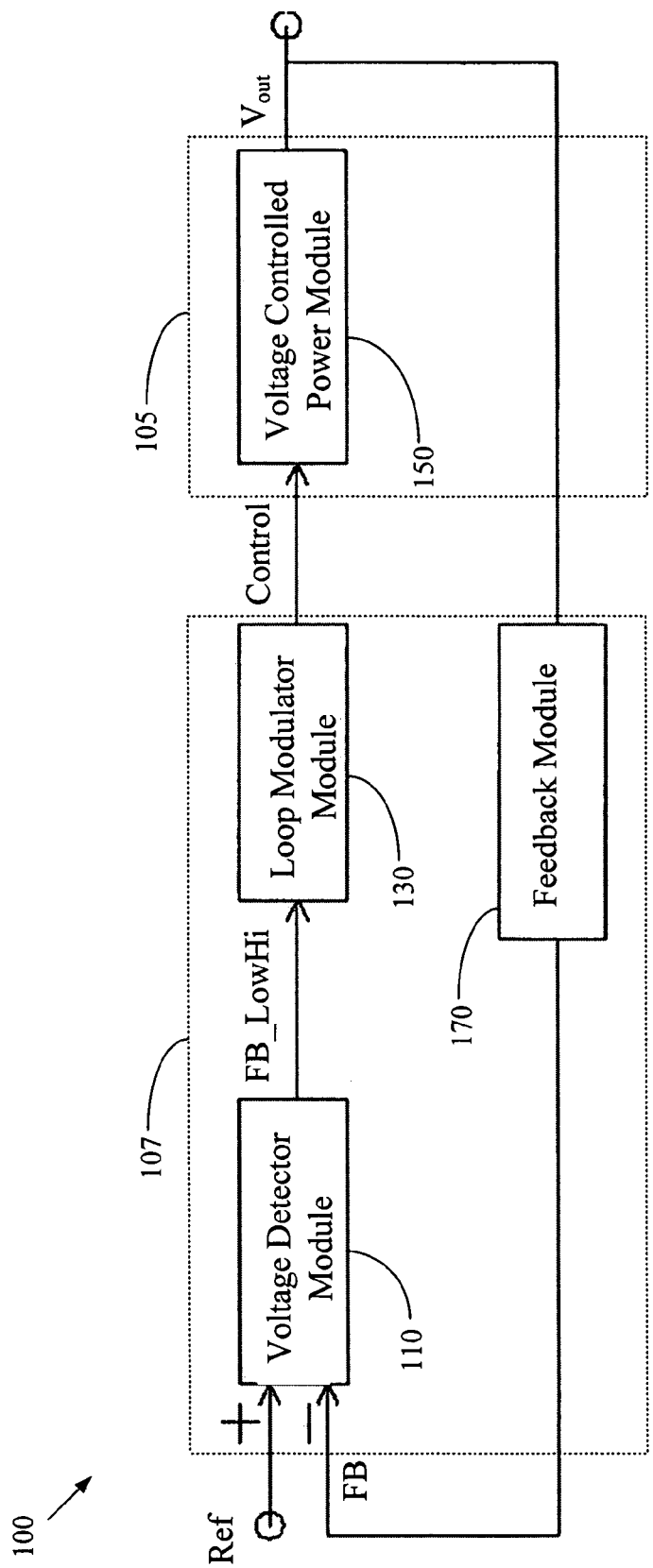
FIG. 1 is a diagram showing a first non-limiting exemplary system for providing output voltage control in a power supply circuit, in accordance with various aspects of the present invention.

FIG. 1 is a diagram showing a first non-limiting exemplary system 100 for providing output voltage control in a power supply circuit, in accordance with various aspects of the present invention. The power supply circuit may comprise characteristics of any of a variety of power supply circuits. For example and without limitation, the power supply circuit may comprise characteristics of a DC-to-DC converter circuit (e.g., a low-dropout or pulse-width-modulated DC-to-DC converter). Also for example, the power supply circuit may comprise characteristics of any of a variety of buck or boost converter circuits. Further for example, the power supply circuit may comprise characteristics of any of a variety of types of inverter circuits.

The following systems and circuits may be presented in terms of various functional modules. Such a modular presentation is for illustrative clarity and should not limit the scope of various aspects of the present invention. For example, various functional modules may be implemented in hardware circuits (or sub-circuits), software routines (or sub-routines) or a combination thereof. Also for example, various functional modules may share various sub-modules or sub-components. For example, a plurality of hardware modules may share hardware components (e.g., circuits, sub-circuits, components, etc.), and a plurality of software modules may share software components (e.g., subroutines, data structures, etc.). Further for example, various functional modules may be implemented in varying degrees of integration. For example, a functional module may be implemented using a plurality of discrete components, one or more integrated circuits, a portion of an integrated circuit, etc. Accordingly, the scope of various aspects of the present invention should not be limited by characteristics of particular hardware and/or software implementations, arbitrary boundaries between modules or particular degrees of integration.

The exemplary system 100 may comprise at least a first module 105. The first module 105 may, for example, be adapted to receive an input voltage (e.g., an input DC voltage) and at least one voltage control signal. The first module 105 may then, for example, be adapted to output (or generate) a voltage (e.g., an output DC voltage) that is a function of (i.e., at least a function of) the input DC voltage and the at least one voltage control signal. The first module 105 may, for example and without limitation, comprise a voltage controlled power module 150.

Figure 2:
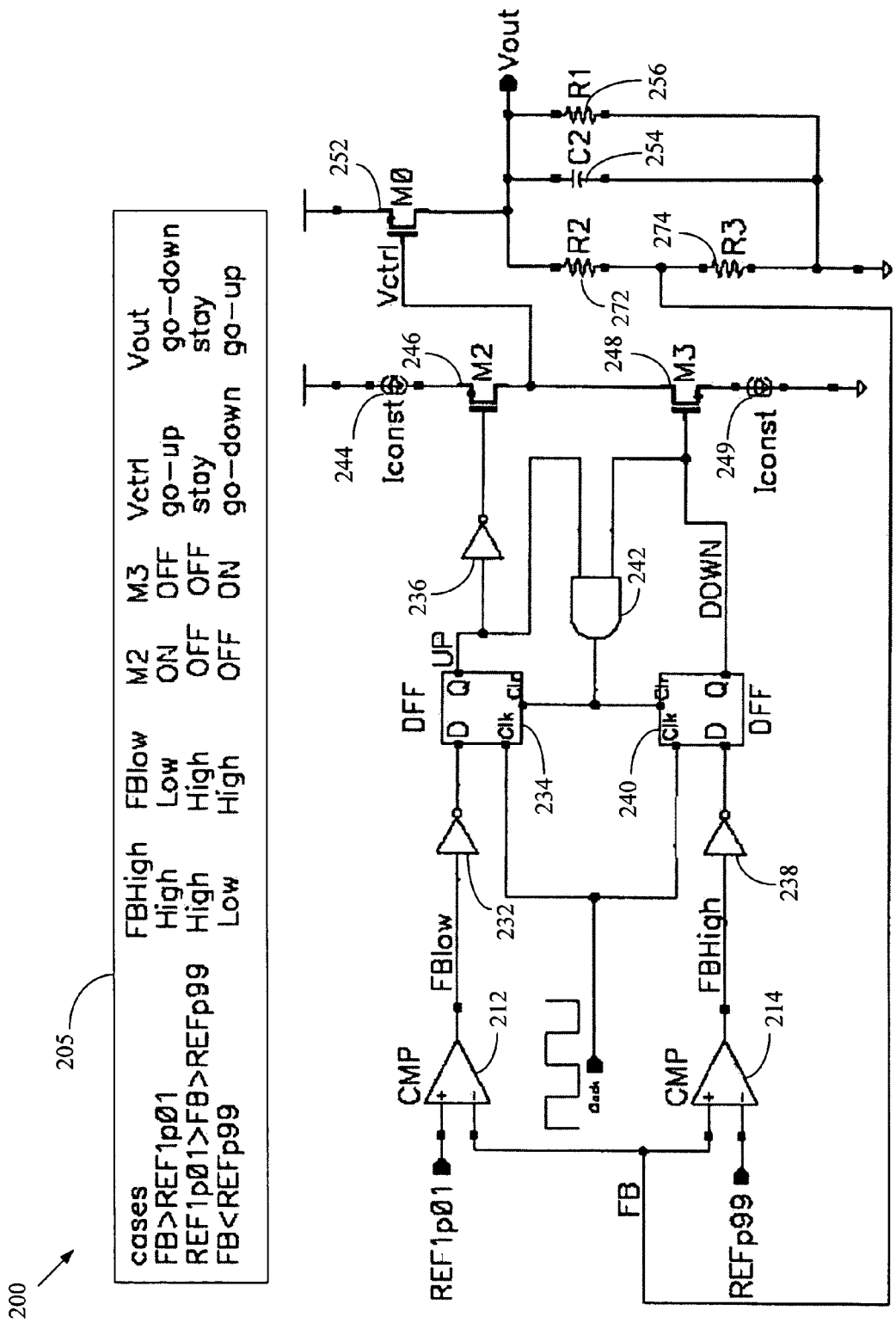
FIG. 2 is a diagram showing a second non-limiting exemplary system for providing output voltage control in a low-dropout ("LDO") power supply circuit, in accordance with various aspects of the present invention.
Figure 3:
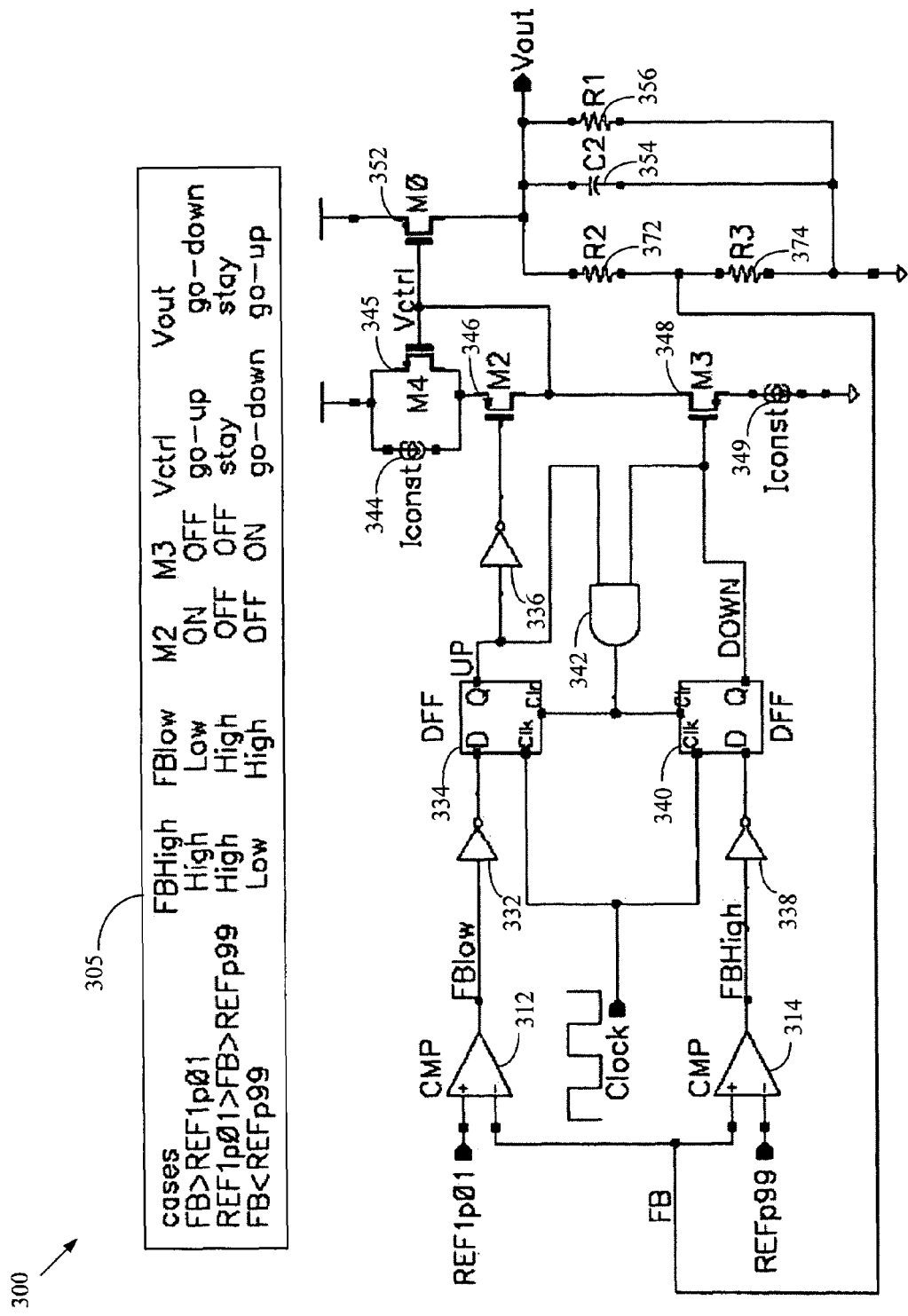
FIG. 3 is a diagram showing a third non-limiting exemplary system for providing output voltage control in a low-dropout ("LDO") power supply circuit, in accordance with various aspects of the present invention.
Figure 4:
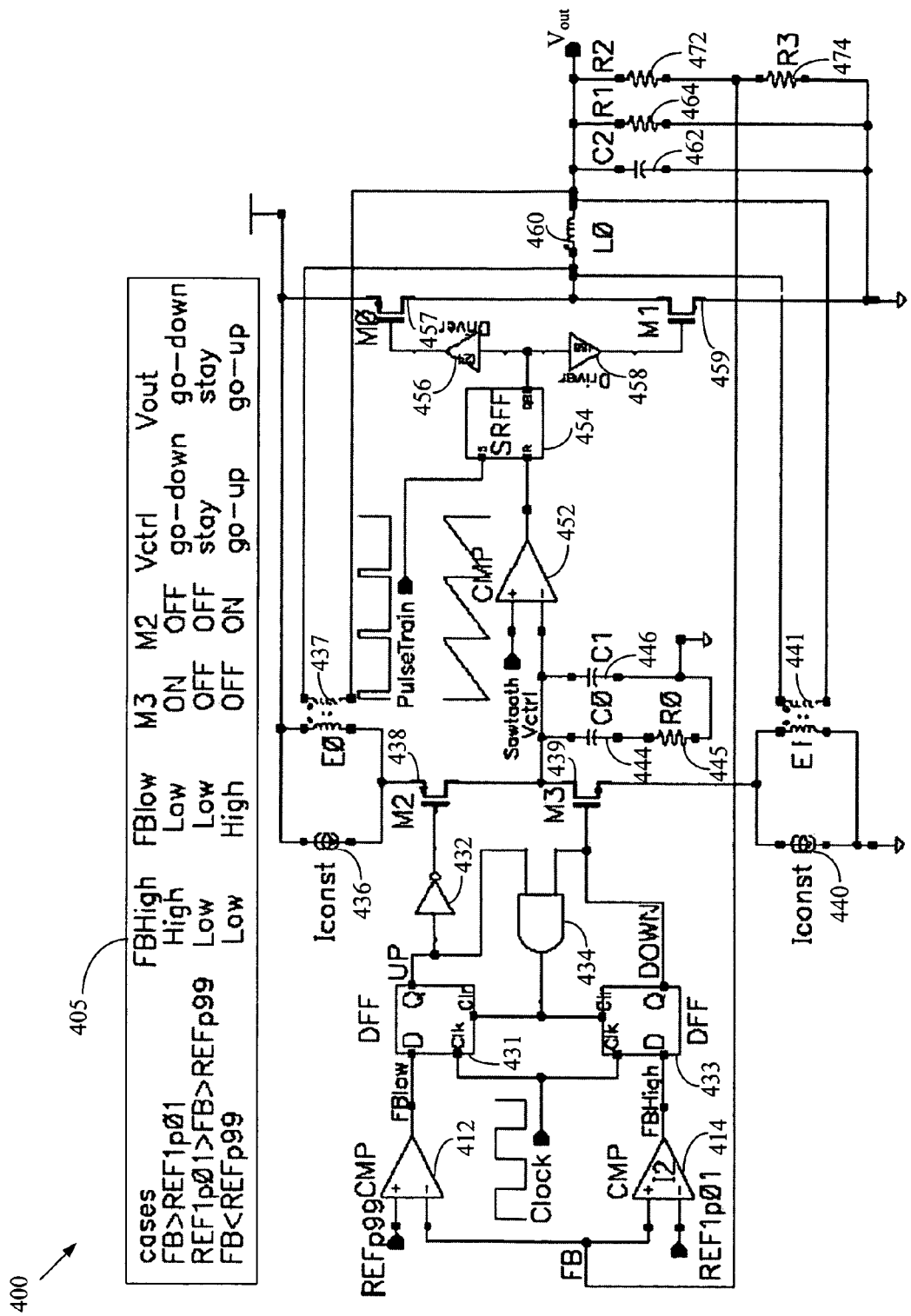
FIG. 4 is a diagram showing a fourth non-limiting exemplary system for providing output voltage control in a pulse-width-modulator ("PWM") power supply circuit, in accordance with various aspects of the present invention.
Figure 5:
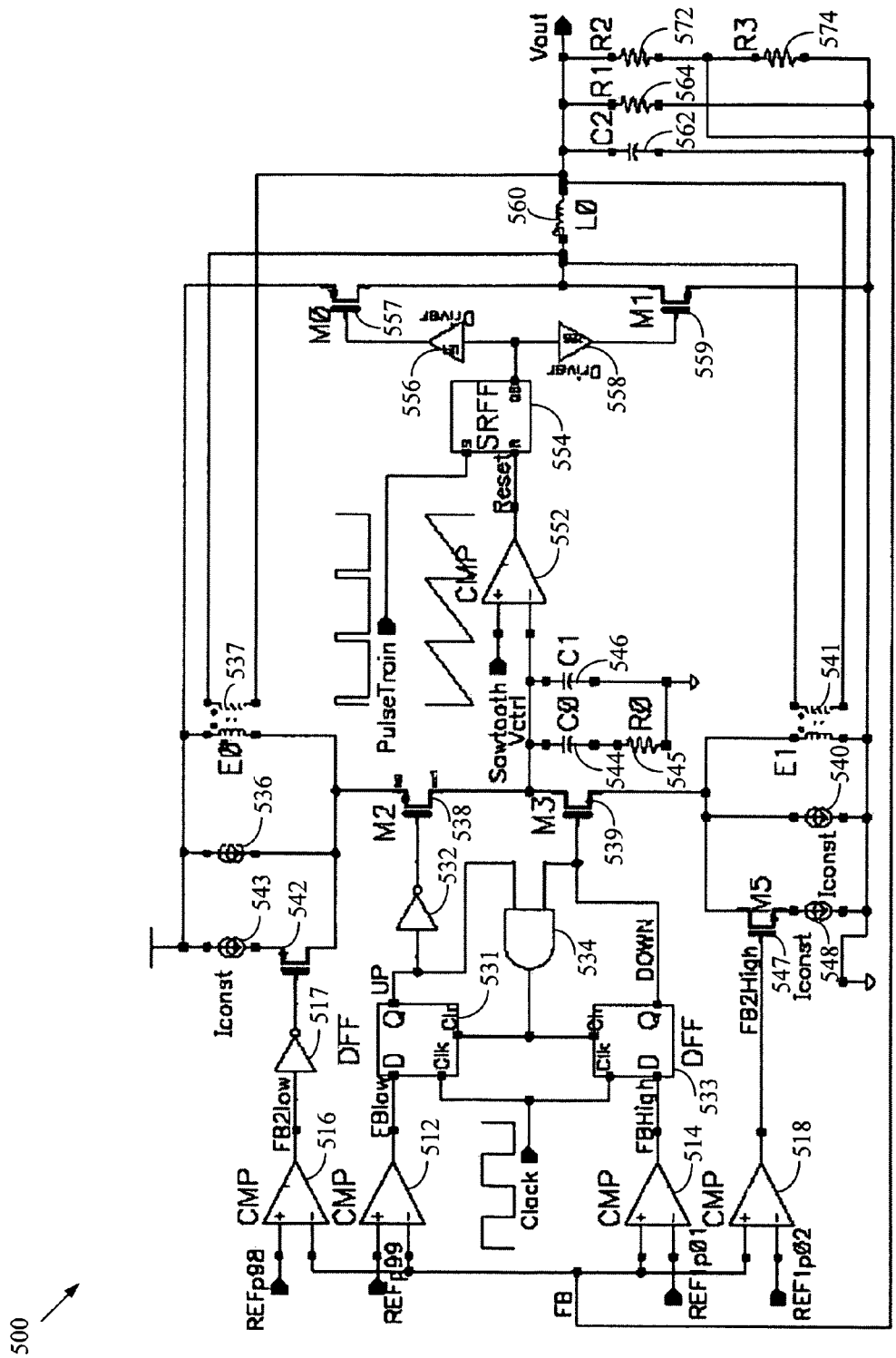
FIG. 5 is a diagram showing a fifth non-limiting exemplary system for providing output voltage control in a pulse-width-modulator ("PWM") power supply circuit, in accordance with various aspects of the present invention.

The voltage controlled power module 150 may comprise characteristics of any of a variety of power modules. For example and without limitation, as will be illustrated later in various exemplary circuits (e.g., as illustrated in FIGS. 2-3), the voltage controlled power module 150 may comprise characteristics of a low-dropout ("LDO") converter. Also for example, as will be illustrated later in various exemplary circuits (e.g., as illustrated in FIGS. 4-5) the voltage controlled power module 150 may comprise characteristics of a pulse-width-modulator ("PWM") converter. Note that the utilization of LDO and PWM converters as examples is by no means to be construed as limiting the scope of various aspects of the present invention to particular characteristics of such exemplary converters.

The exemplary system 100 may also comprise at least a second module 107. The second module 107 may, for example, be adapted to receive at least one feedback signal representative of a voltage (e.g., as output from the first module 105). The second module 107 may then, for example, be adapted to output at least one voltage control signal as a function of the feedback signal (i.e., a function of at least the feedback signal). The voltage control signal may, for example, be the same voltage control received by the first module 105 (or voltage controlled power module 150) discussed previously.

The second module 107 may comprise characteristics of any of a variety of modules. The following discussion will present the second module 107 in terms of three functional sub-modules. Such functional sub-modules include a voltage detector module 110, loop modulator module 130 and feedback module 170. This particular combination of functional modules (or sub-modules) is presented for illustrative clarity only and should not limit the scope of various aspects of the present invention to particular characteristics of the illustrative functional modules.

The voltage detector module 110 may, for example, be adapted to receive a feedback signal representative of an output voltage (e.g., an output DC voltage output from the first module 105 discussed previously) and output at least one voltage control signal as a function of the feedback signal (i.e., a function of at least the feedback signal). The voltage detector module 110 may, for example, be formed primarily or entirely of digital active components. Such digital active components may, for example, be combined with various passive components (e.g., resistors, inductors and capacitors). A digital configuration for a voltage detector module 110 has various advantages (e.g., response time, noise immunity and non-linear operational ability) over various configurations utilizing analog active components (e.g., operational amplifiers). FIGS. 2-5 will later provide non-limiting illustrations of such digital configurations.

As a non-limiting example, the voltage detector module 110 may be adapted to receive a feedback signal and identify a voltage region (e.g., of a plurality of voltage regions) to which the feedback signal corresponds. The voltage detector module 110 may then, for example, be adapted to generate one or more signals indicative of the identified voltage region.

In a non-limiting exemplary configuration, the voltage detector module 110 may be adapted to identify one of three voltage regions to which the feedback signal corresponds. For example, a first voltage region might correspond to an output voltage (e.g., an output DC voltage) being too high relative to a desired voltage, a second voltage region might correspond to the output voltage (e.g., the output DC voltage) being too low relative to the desired voltage, and a third voltage region might correspond to the output voltage (e.g., the output DC voltage) being at an acceptable voltage level (e.g., within an acceptable voltage range). The voltage detector module 110 may then, for example, be adapted to generate one or more signals indicative of the identified voltage region.

In another non-limiting exemplary configuration, the voltage detector module 110 may be adapted to identify one of five voltage regions to which the feedback signal corresponds. For example, a first voltage region might correspond to an output voltage (e.g., an output DC voltage) being much too high relative to a desired voltage, a second voltage region might correspond to the output voltage being too high relative to a desired voltage, a third voltage region might correspond to the output voltage being much too low relative to the desired voltage, a fourth voltage region might correspond to the output voltage being too low relative to the desired voltage, and a fifth voltage region might correspond to the output voltage being at an acceptable voltage level (e.g., within an acceptable voltage range). The voltage detector module 110 may then, for example, be adapted to generate one or more signals indicative of the identified voltage region.

The voltage detector module 110 may be characterized by any of a variety of hardware and/or software configurations. For example, the voltage detector module 110 may comprise a plurality of comparators adapted to compare a feedback signal to a plurality of respective references. The voltage detector module 110 may then, for example, be adapted to generate one or more signals indicative of the plurality of comparisons. Non-limiting examples of such comparator utilization will be presented later in FIGS. 2-5.

As will be discussed below with regard to the feedback module 170, the feedback signal(s) may comprise characteristics of an analog or digital signal. For example, in a scenario where the feedback signal is an analog signal, the voltage detector module 110 may be adapted to compare the feedback signal to one or more analog reference signals. Also for example, in a scenario where the feedback signal is a digital signal, the voltage detector module 110 may be adapted to compare the digital feedback signal to one or more digital reference signals.

The loop modulator module 130 may be adapted to generate one or more voltage control signals (e.g., utilized to control the first module 105 or voltage controlled power module 150). The loop modulator module 130 may, for example, be adapted to generate at least one voltage control signal in any of a variety of manners.

For example, consider the non-limiting exemplary configuration discussed previously, where the voltage detector module 110 is adapted to identify one of three voltage regions to which a feedback signal corresponds. In such an exemplary configuration, for a feedback signal corresponding to the first voltage region, the loop modulator module 130 may be adapted to generate at least one voltage control signal adapted to cause the voltage controlled power module 150 to reduce the output voltage (e.g., the output DC voltage). Also, for a feedback signal corresponding to the second voltage region, the loop modulator module 130 may be adapted to generate at least one voltage control signal adapted to cause the voltage controlled power module 150 to increase the output voltage. Further, for a feedback signal corresponding to the third voltage region, the loop modulator module 130 may be adapted to generate at least one voltage control signal adapted to cause the voltage controlled power module 150 to maintain the present output voltage (e.g., the present output DC voltage).

Also for example, consider the non-limiting exemplary configuration discussed previously, where the voltage detector module 110 is adapted to identify one of five voltage regions to which a feedback signal corresponds. In such an exemplary configuration, for a feedback signal corresponding to the first voltage region, the loop modulator module 130 may be adapted to generate at least one voltage control signal adapted to cause the voltage controlled power module 150 to reduce the output voltage (e.g., the output DC voltage) relatively rapidly. Also, for a feedback signal corresponding to the second voltage region, the loop modulator module 130 may be adapted to generate at least one voltage control signal adapted to cause the voltage controlled power module 150 to reduce the output voltage relatively slowly. Additionally, for a feedback signal corresponding to the third voltage region, the loop modulator module 130 may be adapted to generate at least one voltage control signal adapted to cause the voltage controlled power module 150 to increase the output voltage relatively rapidly. Further, for a feedback signal corresponding to the fourth voltage region, the loop modulator module 130 may be adapted to generate at least one voltage control signal adapted to cause the voltage controlled power module 150 to increase the output voltage relatively slowly. Still further, for a feedback signal corresponding to the fifth voltage region, the loop modulator module 130 may be adapted to generate at least one voltage control signal adapted to cause the voltage controlled power module 150 to maintain the present output voltage (e.g., the present output DC voltage).

The loop modulator module 130 may be adapted to generate at least one voltage control signal in any of a variety of manners. For example and without limitation, the loop modulator module 130 may comprise digital switching circuitry (e.g., without any active analog circuitry) adapted to drive transistor circuitry, which in turn, outputs one or more voltage control signals based upon the state of the digital switching circuitry. In such an exemplary configuration, the transistor circuitry may, for example, output a digital voltage control signal, the transistor circuitry may utilize internal capacitance and/or resistance to generate an analog voltage control signal, or the transistor circuitry may drive various passive components (e.g., configured in an RC network) to generate an analog voltage control signal. Various non-limiting exemplary configurations will be presented later in FIGS. 2-5.

The feedback module 170 may generally be adapted to communicate a signal indicative of the output voltage (e.g., output from the first module 105) to the second module 107 (e.g., the voltage detector module 110). The feedback module 170 may comprise any of a variety of circuit configurations. For example and without limitation, in a first exemplary configuration, the feedback module 170 might comprise a conductive path between the output voltage (e.g., output DC voltage) and the voltage detector 110. In a second exemplary configuration, the feedback module 170 may comprise a voltage divider or other voltage-scaling circuit, which converts the output voltage (e.g., output DC voltage) to a desired scale. In a third exemplary configuration, the feedback module 170 may comprise analog-to-digital circuitry that converts the output voltage (e.g., output DC voltage) to a digital representation.

The exemplary system 100 was presented to provide a non-limiting illustration of various aspects of the present invention. Accordingly, the scope of various aspects of the present invention should not be limited by particular characteristics of the exemplary system 100. The exemplary systems 200-500 illustrated in FIGS. 2-5 will now be presented to further illustrate various aspects of the present invention.

FIG. 2 is a diagram showing a second non-limiting exemplary system 200 for providing output voltage control in a low-dropout ("LDO") power supply circuit, in accordance with various aspects of the present invention. The exemplary system 200 may, for example and without limitation, share any or all characteristics with the exemplary system 100 discussed previously.

The exemplary system 200 may output an output DC voltage, $V_{out}$. The exemplary system 200 may comprise a second resistor 272 and third resistor 274 in a voltage divider configuration between $V_{out}$ and ground. The second resistor 272 and third resistor 274 in the voltage divider configuration may, for example and without limitation, share any or all characteristics with the feedback module 170 of the exemplary system 100 discussed previously. The output of the voltage divider configuration, signal FB, is fed back to the front end of the exemplary system 200.

The exemplary system 200 may comprise a first comparator 212 and a second comparator 214. The first comparator 212 and second comparator 214 in the illustrated configuration may, for example and without limitation, share any or all characteristics with the voltage detector module 110 of the exemplary system 100 discussed previously.

The first comparator 212 may receive a first reference signal, REF1p01 (e.g., 1.01*$V_{ref}$), and the feedback signal, FB. The first comparator 212 may compare REF1p01 and FB and output a digital signal, $FB_{low}$, indicative of the comparison. The second comparator 214 may receive a second reference signal, REFp99 (e.g., 0.99*$V_{ref}$), and the feedback signal, FB. The second comparator 214 may compare REFp99 and FB and output a digital signal, $FB_{High}$, indicative of the comparison.

The first comparator 212 and the second comparator 214 may be adapted to output a pair of signals indicative of one of three voltage regions to which the feedback signal, FB, corresponds. The table 205 illustrates values of $FB_{High}$ and $FB_{low}$ for each of the three voltage regions. For example, for FB greater than REF1p01, $FB_{High}$ will be logic high and $FB_{Low}$ will be logic low. Also for example, for FB less than REFp99, $FB_{High}$ will be logic low and $FB_{Low}$ will be logic high. Further for example, for FB between REFp99 and REF1p01, $FB_{High}$ will be logic high and $FB_{Low}$ will be logic high. Thus, the combination of $FB_{High}$ and $FB_{Low}$ may be indicative of whether $V_{out}$ is too high, too low or at an acceptable voltage level (e.g., in an acceptable voltage range).

The exemplary system 200 may also comprise various logic components adapted to convert the $FB_{High}$ and $FB_{Low}$ signals into transistor switching signals. Such logic components may, for example, comprise a first inverter 232, first D flip-flop 234, second inverter 238, second D flip-flop 240, third inverter 236 and AND gate 242.

The first inverter 232 may be adapted to invert the $FB_{Low}$ signal, which is then clocked into the first D flip-flop 234. The second inverter 238 may be adapted to invert the $FB_{High}$ signal, which is then clocked into the second D flip-flop 240. The output of the first D flip-flop 234 may then be inverted by the third inverter 236.

The exemplary system 200 may also comprise various transistors, which may be utilized to switch current sources, thereby generating a voltage control signal, $V_{ctrl}$. For example, the exemplary system 200 may comprise a power input coupled to a first current source 244, which is coupled to a second transistor 246 (e.g., a P-MOS transistor), which is coupled to a third transistor 248 (e.g., an N-MOS transistor), which is coupled to a second current source 249, which is coupled to ground. The voltage control signal, $V_{ctrl}$, may, for example, be generated at the junction between the second transistor 246 and the third transistor 248.

The output of the third inverter 236 may control operation of the second transistor 246, and the output of the second D flip-flop 240 may control operation of the third transistor 248. The table 205 illustrates the switching states for the second transistor 246 ("M2") and the third transistor 248 ("M3"). For example, when $FB_{High}$ is high and $FB_{low}$ is low, the second transistor 246 is generally on, the third transistor 248 is generally off, and $V_{ctrl}$ will increase. Also for example, when $FB_{High}$ is low and $FB_{low}$ is high, the second transistor 246 is generally off, the third transistor 248 is generally on, and $V_{ctrl}$ will decrease. Further for example, when $FB_{High}$ is high and $FB_{low}$ is high, the second transistor 246 is generally off, the third transistor 248 is generally off, and $V_{ctrl}$ will stay generally constant (e.g., due, at least in part, to internal capacitances of the second transistor 246 and/or third transistor 248).

The logic components (e.g., first inverter 232, first D flip-flop 234, second inverter 238, second D flip-flop 240, third inverter 236 and AND gate 242), first current source 244, second transistor 246, third transistor 248 and second current source 249 may, for example and without limitation, share any or all characteristics with the loop modulator 130 of the exemplary system 100 discussed previously.

The exemplary system 200 may also comprise a power source coupled to a first transistor 252 (e.g., a P-MOS transistor), which in turn, is coupled to ground through a parallel RC circuit. The parallel RC circuit may, for example, comprise a first resistor 256 and first capacitor 254. The DC output voltage may then be generated at the junction between the first transistor 252, the first resistor 256 and the first capacitor 254. When the first transistor 252 is biased relatively higher (e.g., by an increasing $V_{ctrl}$), the output DC voltage decreases, when the first transistor 252 is biased relatively lower (e.g., by a decreasing $V_{ctrl}$) the output DC voltage increases, and when the first transistor 252 is biased relatively consistently (e.g., by a relatively constant $V_{ctrl}$), the output DC voltage stays substantially the same. This relationship is also illustrated in the table 205.

The table 205 shows that the voltage-locked loop will operate to lock $V_{out}$ when REF1p01>FB>REFp99. When FB>REF1p01, $V_{out}$ is higher than desired, so the voltage-locked loop will operate to decrease $V_{out}$ until the condition REF1p01>FB>REFp99 is satisfied. When FB<REFp99, $V_{out}$ is lower than desired, so the voltage-locked loop will operate to increase $V_{out}$ until the condition REF1p01>FB>REFp99 is satisfied.

The first transistor 252, first resistor 256 and first capacitor 254 may, for example and without limitation, share any or all characteristics with the voltage controlled power module 150 of the exemplary system 100 discussed previously.

FIG. 3 is a diagram showing a third non-limiting exemplary system 300 for providing output voltage control in a low-dropout ("LDO") power supply circuit, in accordance with various aspects of the present invention. The exemplary system 300 may, for example and without limitation, share any or all characteristics with the exemplary systems 100-200 illustrated in FIGS. 1-2 and discussed previously. The exemplary system 300 is substantially similar to the exemplary system 200 of FIG. 2, and thus, the following discussion will primarily focus on the differences between the exemplary system 300 and the exemplary system 200 of FIG. 2.

The exemplary system 300 may, for example, comprise a fourth transistor 345 (e.g., a P-MOS transistor) in a current mirror configuration with the first transistor 352. In such a configuration, the load current through the first transistor 352 is fed back and added to the charging current utilized to generate $V_{ctrl}$. Accordingly, the bandwidth of the voltage control loop is increased. Such a configuration may be referred to herein as a "current mode voltage lock loop" versus a "voltage mode voltage lock loop" of FIG. 2.

FIG. 4 is a diagram showing a fourth non-limiting exemplary system 400 for providing output voltage control in a pulse-width-modulator ("PWM") power supply circuit, in accordance with various aspects of the present invention. The exemplary system 400 may, for example and without limitation, share any or all characteristics with the exemplary systems 100-300 illustrated in FIGS. 1-3 and discussed previously.

The exemplary system 400 may output an output DC voltage, $V_{out}$. The exemplary system 400 may comprise a second resistor 472 and third resistor 474 in a voltage divider configuration between $V_{out}$ and ground. The second resistor 472 and third resistor 474 in the voltage divider configuration may, for example and without limitation, share any or all characteristics with the feedback module 170 of the exemplary system 100 discussed previously. The output of the voltage divider configuration, signal FB, is fed back to the front end of the exemplary system 400.

The exemplary system 400 may comprise a first comparator 412 and a second comparator 414. The first comparator 412 and second comparator 414 in the illustrated configuration may, for example and without limitation, share any or all characteristics with the voltage detector module 110 of the exemplary system 100 discussed previously.

The first comparator 412 may receive a first reference signal, REFp99 (e.g., 0.99*$V_{ref}$), and the feedback signal, FB. The first comparator 412 may compare REFp99 and FB and output a digital signal, $FB_{low}$, indicative of the comparison.

The second comparator 414 may receive a second reference signal, REF1p01 (e.g., 1.01*$V_{ref}$), and the feedback signal, FB. The second comparator 414 may compare REF1p01 and FB and output a digital signal, $FB_{High}$, indicative of the comparison.

The first comparator 412 and the second comparator 414 may be adapted to output a pair of signals indicative of one of three voltage regions to which the feedback signal, FB, corresponds. The table 405 illustrates values of $FB_{High}$ and $FB_{low}$ for each of the three voltage regions. For example, for FB greater than REF1p01, $FB_{High}$ will be logic high and $FB_{Low}$ will be logic low. Also for example, for FB less than REFp99, $FB_{High}$ will be logic low and $FB_{Low}$ will be logic high. Further for example, for FB between REFp99 and REF1p01, $FB_{High}$ will be logic low and $FB_{Low}$ will be logic low. Thus, the combination of $FB_{High}$ and $FB_{Low}$ may be indicative of whether $V_{out}$ is too high, too low or at an acceptable voltage level (e.g., in an acceptable voltage range).

The exemplary system 400 may also comprise various logic components adapted to convert the $FB_{High}$ and $FB_{Low}$ signals into transistor switching signals. Such logic components may, for example, comprise a first D flip-flop 431, first inverter 432, second D flip-flop 433 and AND gate 434.

$FB_{Low}$ is clocked into the first D flip-flop 431, and $FB_{High}$ is clocked into the second D flip-flop 433. The first inverter 432 may be adapted to invert the $FB_{Low}$ signal that was clocked into the first D flip-flop 431.

The exemplary system 400 may also comprise various transistors, which may be utilized to switch current sources, thereby generating a voltage control signal, $V_{ctrl}$. For example, the exemplary system 400 may comprise a power input coupled to a first current source 436 and first current mirror 437, which are coupled to a first transistor 438 (e.g., a P-MOS transistor), which is coupled to a second transistor 439 (e.g., an N-MOS transistor), which is coupled to a second current source 440 and a second current mirror 441, which are coupled to ground.

The junction of the first transistor 438 and the second transistor 439 may be coupled to a second capacitor 446 and a fourth resistor 445 through a third capacitor 444. The voltage control signal, $V_{ctrl}$, may, for example, be generated at the junction between the first transistor 438 and the second transistor 439 with the second capacitor 446, third capacitor 444 and fourth resistor 445 coupled to $V_{ctrl}$ to form type-2 compensation.

The output of the first inverter 432 may control operation of the first transistor 438, and the output of the second D flip-flop 433 may control operation of the second transistor 439. The table 405 illustrates the switching states for the first transistor 438 ("M2") and the second transistor 439 ("M3"). For example, when $FB_{High}$ is high and $FB_{low}$ is low, the first transistor 438 is generally off, the second transistor 439 is generally on, and $V_{ctrl}$ will decrease. Also for example, when $FB_{High}$ is low and $FB_{low}$ is high, the first transistor 438 is generally on, the third transistor 439 is generally off, and $V_{ctrl}$ will increase. Further for example, when $FB_{High}$ is low and $FB_{low}$ is low, the first transistor 438 is generally off, the second transistor 439 is generally off, and $V_{ctrl}$ will stay generally constant (e.g., due, at least in part, to the second capacitor 446, fourth resistor 445 and third capacitor 444).

The logic components (e.g., first D flip-flop 431, first inverter 432, second D flip-flop 433 and AND gate 434), first current source 436, first current mirror 437, first transistor 438, second transistor 439, second current source 440, second current mirror 441, second capacitor 446, third capacitor 444 and fourth resistor 445 may, for example and without limitation, share any or all characteristics with the loop modulator 130 of the exemplary system 100 discussed previously.

The exemplary system 400 may also comprise a power source coupled to a third transistor 457 (e.g., a P-MOS transistor), which is coupled to a fourth transistor 459, which is coupled to ground. The junction of the third transistor 457 and fourth transistor 459 may be coupled to a parallel RC circuit through an inductor 460. The inductor 460 may be related to the first current mirror 437 and second current mirror 441. The parallel RC circuit may, for example, comprise a first resistor 464 and first capacitor 462. The output DC voltage may then be generated at the junction between the inductor 460, the first capacitor 462 and the first resistor 464. When the third transistor 457 is biased on and the fourth transistor 459 is biased off, the output DC voltage increases, and when the third transistor 457 is biased off and the fourth transistor 459 is biased on, the output DC voltage decreases.

The exemplary system 400 may also comprise circuitry to control the duty cycle with which the third transistor 457 and fourth transistor 459 are operated (e.g., as a function of $V_{ctrl}$). For example, the exemplary system 400 may comprise a third comparator 452 that receives a sawtooth signal and $V_{ctrl}$. The third comparator 452 may output logic high when the sawtooth signal is greater than $V_{ctrl}$ and a logic low when the sawtooth signal is less than $V_{ctrl}$. Accordingly, modifying $V_{ctrl}$ may result in adjusting the duty cycle of the signal output from the third comparator 452.

The exemplary system 400 may also comprise an SR latch 454. The SR latch 454 may receive a pulse train signal at the S input and the output of the third comparator 452 at the R input. The rising edge of the pulse train signal may be synchronized to the falling edge of the sawtooth signal input to the third comparator 452. During operation, a pulse from the pulse train signal may set the SR latch 454, thereby resetting the inverting output of the SR latch 454, which causes the first driver 456 to turn on the third transistor 457 and the second driver 458 to turn off the fourth transistor 459. Such a state will cause the DC output voltage $V_{out}$ to increase. After the pulse, as the sawtooth signal rises above $V_{ctrl}$, the third comparator 452 resets the SR latch 454, thereby setting the inverting output of the SR latch 454, which causes the first driver 456 to turn off the third transistor 457 and the second driver 458 to turn on the fourth transistor 459. Such a state will cause the DC output voltage $V_{out}$ to decrease.

Thus, a relatively lower $V_{ctrl}$ signal will decrease the pulse width of the charging pulse and increase discharging time, effectively reducing $V_{out}$, and a relatively higher $V_{ctrl}$ signal will increase the pulse width of the charging pulse and decrease discharging time, effectively increasing $V_{out}$. This relationship is illustrated in the table 405.

The table 405 shows that the voltage-locked loop will operate to lock $V_{out}$ when REF1p01>FB>REFp99. When FB>REF1p01, $V_{out}$ is higher than desired, so the voltage-locked loop will operate to decrease $V_{out}$ until the condition REF1p01>FB>REFp99 is satisfied. When FB<REFp99, $V_{out}$ is lower than desired, so the voltage-locked loop will operate to increase $V_{out}$ until the condition REF1p01>FB>REFp99 is satisfied.

As discussed previously with regard to FIG. 3, the incorporation of the first current mirror 437 and the second current mirror 441 acts to increase the bandwidth of the voltage control loop. As an example, to convert the configuration of the exemplary system 400 from that of a current mode voltage lock loop to a voltage mode voltage lock loop, the first current mirror 437 and second current mirror 441 (and inductor 460) may be removed.

The exemplary systems 200-400 illustrated in FIGS. 2-4 have generally utilized three voltage control regions. Various aspects of the present invention provide for the utilization of any number of voltage control regions. Flexibility in the number of voltage control regions and in the manner in which voltage is controlled for each region provides a large number of possibilities for improved voltage lock performance. FIG. 5, to be discussed next, provides an illustration of a non-linear voltage lock loop with five voltage control regions.

FIG. 5 is a diagram showing a fifth non-limiting exemplary system 500 for providing output voltage control in a pulse-width-modulator ("PWM") power supply circuit, in accordance with various aspects of the present invention. The exemplary system 500 may, for example and without limitation, share any or all characteristics with the exemplary systems 100-400 illustrated in FIGS. 1-4 and discussed previously. The exemplary system 500 is substantially similar to the exemplary system 400 of FIG. 4, and thus, the following discussion will primarily focus on the differences between the exemplary system 500 and the exemplary system 400 of FIG. 4.

The exemplary system 500 may comprise a fourth comparator 516, second inverter 517, third current source 543 and fifth transistor 542 (e.g., a P-MOS transistor). The fourth comparator 516 may be adapted to receive a fourth reference signal, REFp98 (e.g., 0.98*$V_{ref}$), and the feedback signal, FB. When FB is lower than REFp98, the fourth comparator 516 outputs a logic high, which the second inverter 517 converts to a logic low, thereby turning on the fifth transistor 542 allowing additional charging current from the third current source 543 to increase $V_{ctrl}$ in a relatively expeditious manner. Accordingly, when FB indicates that $V_{out}$ is much too low, $V_{ctrl}$ is quickly increased to effectively increase the width of the charging pulse of the PWM converter and increase the output DC voltage $V_{out}$.

Also, the exemplary system 500 may comprise a fifth comparator 518, fourth current source 548 and sixth transistor 547 (e.g., an N-MOS transistor). The fifth comparator 518 may be adapted to receive a fifth reference signal, REF1p02 (e.g., 1.02*Vref), and the feedback signal, FB. When FB is higher than REF1p02, the fifth comparator 518 outputs a logic high, thereby turning on the sixth transistor 547 allowing additional discharging current from the fourth current source 548 to decrease $V_{ctrl}$ in a relatively expeditious manner. Accordingly, when FB indicates that $V_{out}$ is much too high, $V_{ctrl}$ is quickly decreased to effectively decrease the width of the charging pulse of the PWM converter and decrease the output DC voltage $V_{out}$.

During the previous discussion of the exemplary systems 200-500 of FIGS. 2-5, various reference voltages (or reference multiplication factors) were presented for illustrative example only. The scope of various aspects of the present invention should not be limited by characteristics of any particular reference signals or relationships between particular reference signals. Additionally, various configurations comprising three and five voltage control regions were also presented for illustrative example only. The scope of various aspects of the present invention should not be limited by any particular number of voltage control regions.

The exemplary systems 100-500 of FIGS. 1-5 were presented to provide various non-limiting illustrations of various aspects of the present invention. The scope of various aspects of the present invention should not be limited by particular characteristics of the exemplary systems 100-500.

Figure 6:
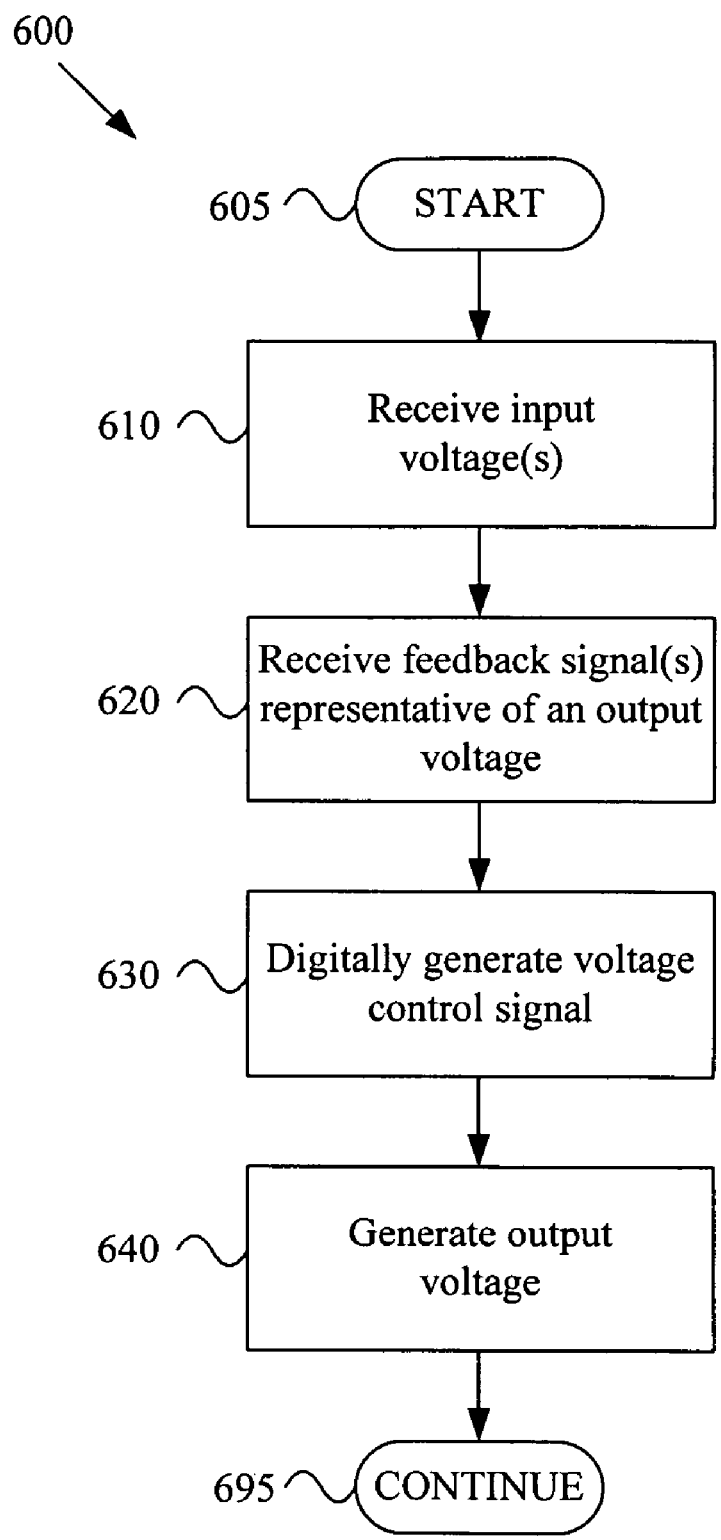
FIG. 6 is a flow diagram showing a first non-limiting method for providing output voltage control in a power supply circuit, in accordance with various aspects of the present invention.

FIG. 6 is a flow diagram showing a first non-limiting method 600 for providing output voltage control in a power supply circuit, in accordance with various aspects of the present invention. The exemplary method 600 may, for example and without limitation, share any or all functional characteristics with the exemplary systems 100-500 illustrated in FIGS. 1-5 and discussed previously.

The exemplary method 600 may be implemented in any of a variety of power supply circuits. For example and without limitation, the exemplary method 600 may be implemented in a low-dropout or pulse-width-modulated DC-to-DC converter. The exemplary method 600 may also, for example, be implemented in any of a variety of buck or boost converters. The exemplary method 600 may also, for example, be implemented in any of a variety of inverter configurations. Though the following discussion will generally illustrate various aspects of the present invention in the context of a DC-to-DC converter, this should not limit the scope of various aspects of the present invention to DC-to-DC converter characteristics.

The exemplary method 600 may begin executing at step 605. The exemplary method 600 may begin executing for any of a variety of reasons. For example and without limitation, the exemplary method 600 may begin executing upon power-up or resetting a power supply circuit implementing the method 600. Also for example, the exemplary method 600 may begin executing in response to a detected power supply load characteristic, system command, user command, etc. The scope of various aspects of the invention should not be limited by characteristics of any particular initiating cause or condition.

The exemplary method 600 may, at step 610, comprise receiving an input voltage (e.g., an input DC voltage). The input DC voltage may, for example, comprise an input DC voltage that is to be converted into another DC voltage. The input DC voltage may also, for example, comprise an input DC voltage that is to be regulated and/or inverted. Step 610 may comprise receiving an input DC voltage in any of a variety of manners generally associated with receiving an input DC voltage. Accordingly, the scope of various aspects of the present invention should not be limited by characteristics of any particular type of input DC voltage or by any particular manner of receiving an input DC voltage.

The exemplary method 600 may, at step 620, comprise receiving a feedback signal that is representative an output voltage (e.g., an output DC voltage). Step 620 may, for example and without limitation, share any or all functional characteristics with the feedback module 170 of FIG. 1 or any of the corresponding exemplary circuitry illustrated in FIGS. 2-5. The feedback signal may be representative of the output DC voltage in any of a variety of manners. For example and without limitation, the feedback signal may be the same voltage as the output DC voltage. Also for example, the feedback signal may be a scaled representation of the output DC voltage (e.g., formed utilizing voltage dividing circuitry, amplification circuitry, etc.).

The exemplary method 600 may, at step 630, comprise generating (e.g., digitally generating) at least one voltage control signal based, at least in part, on the feedback signal (e.g., as received at step 620). Step 630 may, for example and without limitation, share any or all functional characteristics with the voltage detector module 110 of FIG. 1 or any of the corresponding exemplary circuitry presented in FIGS. 2-5.

Step 630 may, for example, comprise generating the at least one voltage control signal utilizing digital circuitry. As a non-limiting example, step 630 may comprise generating the at least one voltage control signal by utilizing digital circuitry (e.g., comparator circuitry) to identify a voltage region of a plurality of voltage regions to which the feedback signal corresponds, and generating the voltage control signal(s) as a function of the identified voltage region.

In a non-limiting exemplary scenario, step 630 may comprise identifying one of three voltage regions to which the feedback signal corresponds. For example, a first voltage region might correspond to the output DC voltage being too high relative to a desired voltage, a second voltage region might correspond to the output DC voltage being too low relative to the desired voltage, and a third voltage region might correspond to the output DC voltage being at an acceptable level (e.g., within an acceptable range). Step 630 may then, for example, comprise generating one or more voltage control signals based on the identified region. For example, in response to identification of the first voltage region, step 630 may comprise generating at least one voltage control signal adapted to cause a reduction in the output DC voltage. Also for example, in response to identification of the second voltage region, step 630 may comprise generating at least one voltage control signal adapted to cause an increase in the output DC voltage. Further for example, in response to identification of the third voltage region, step 630 may comprise generating at least one voltage control signal adapted to cause maintaining the present output DC voltage.

Step 630 may comprise identifying a voltage region in any of a variety of manners. For example and without limitation, step 630 may comprise utilizing a plurality of comparators to compare the feedback signal to a plurality of respective reference signals.

Step 630 may, for example, comprise generating the at least one voltage control signal by utilizing active electrical components, where all of the active electrical components are digital components (i.e., strictly digital components or analog-capable components configured to operate in a digital or binary manner). Step 630 may also, for example, comprise utilizing passive circuitry (e.g., resistors, capacitors and inductors) in combination with the digital circuitry to generate the at least one voltage control signal. As a non-limiting example, step 630 may comprise generating the voltage control signal(s) by utilizing digital components to control the charging and discharging of passive components (e.g., by controlling transistors). Non-limiting examples of such operation were presented previously in FIGS. 2-5. Note that the voltage control signal(s) may be digital or analog.

In general, step 630 may comprise generating at least one voltage control signal based, at least in part, on the feedback signal (e.g., as received at step 620). Accordingly, the scope of various aspects of the present invention should not be limited by characteristics of a particular manner of performing such operation.

The exemplary method 600 may, at step 640, comprise generating an output DC voltage based, at least in part, on the input DC voltage (e.g., as received at step 610) and the at least one voltage control signal (e.g., as generated at step 630). Step 640 may comprise generating an output DC voltage in any of a variety of manners. For example and without limitation, step 640 may comprise utilizing the at least one voltage control signal to control a LDO converter, PWM converter (e.g., by controlling pulse width) or other DC-to-DC converter. Also for example, step 640 may comprise utilizing the at least one voltage control signal to control operation of any of a variety of buck or boost converter configurations. Further for example, step 640 may comprise utilizing the at least one voltage control signal to control operation of any of a variety of inverter circuit configurations. Accordingly, the scope of various aspects of the present invention should not be limited by a particular manner of utilizing the at least one voltage control signal to control an output voltage.

The exemplary method 600 may, at step 695, comprise performing continued processing. Such continued processing may comprise characteristics of any of a large variety of continued processing activities. For example and without limitation, step 695 may comprise directing execution flow of the method 600 back up to an earlier step for continued operation. Also for example, step 695 may comprise monitoring and controlling additional output voltages. Further for example, step 695 may comprise monitoring performance of a power supply circuit implementing the method 600 and making adaptive adjustments to the method 600 (e.g., to enhance generation of the voltage control signal at step 630). Accordingly, the scope of various aspects of the present invention should not be limited by characteristics of any particular type of continued processing.

The exemplary method 600 illustrated in FIG. 6 was presented to provide non-limiting examples of various aspects of the present invention. Accordingly, the scope of various aspects of the present invention should not be limited by particular characteristics of the exemplary method 600.

In summary, various aspects of the present invention provide a system and method providing output voltage control in a power supply circuit. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A DC-DC voltage converter comprising:
   at least a first module adapted to receive an input DC voltage and at least one voltage control signal and output an output DC voltage that is a function of the input DC voltage and the at least one voltage control signal; and
   at least a second module adapted to receive a feedback signal representative of the output DC voltage and utilize digital circuitry to generate the at least one voltage control signal as a function of at least the feedback signal, wherein:
      the at least a second module comprises a plurality of comparators adapted to compare the feedback signal to a plurality of respective references, and the at least one voltage control signal is based, at least in part, on results of the comparison of the feedback signal to the plurality of respective references;
      the at least a second module comprises passive components utilized to generate the at least one voltage control signal;
      the at least a second module comprises switching circuitry coupled to the passive components; wherein the switching circuitry controls generation of the at least one voltage control signal by the passive components; and
      the at least a second module is adapted to utilize the results of the comparison to control the switching circuitry.

2. The DC-DC voltage converter of claim 1, wherein the at least a second module is adapted to generate the at least one voltage control signal by at least:
   identifying a voltage region of a plurality of voltage regions to which the feedback signal corresponds; and
   generating the at least one voltage control signal based, at least in part, on the identified voltage region.

3. The DC-DC voltage converter of claim 2, wherein the plurality of voltage regions comprises three voltage regions.

4. The DC-DC voltage converter of claim 2, wherein the plurality of voltage regions comprises:
   a first voltage region in which the feedback signal corresponds to the output DC voltage being too high;
   a second voltage region in which the feedback signal corresponds to the output DC voltage being too low; and
   a third voltage region in which the feedback signal corresponds to the output DC voltage being at an acceptable level.

5. The DC-DC voltage converter of claim 2, wherein the plurality of voltage regions comprises five voltage regions.

6. The DC-DC voltage converter of claim 1, wherein the at least one voltage control signal is an analog signal.

7. The DC-DC voltage converter of claim 1, wherein all active components of the at least a second module are digital components.

8. The DC-DC voltage converter of claim 7, wherein the feedback signal is an analog signal.

9. The DC-DC voltage converter of claim 1, further comprising a voltage divider circuit adapted to receive the output DC voltage and output the feedback signal.

10. The DC-DC voltage converter of claim 1, wherein the at least a first module comprises a low-dropout (LDO) converter.

11. The DC-DC voltage converter of claim 1, wherein the at least a first module comprises a pulse-width-modulator (PWM) converter.

12. A DC-DC voltage converter comprising:
   at least a first module adapted to receive an input DC voltage and at least one analog voltage control signal and output an output DC voltage that is a function of the input DC voltage and the at least one analog voltage control signal; and
   at least a second module adapted to receive a feedback signal representative of the output DC voltage and utilize digital circuitry to generate the at least one analog voltage control signal as a function of at least the feedback signal, wherein:
      the at least a second module comprises a plurality of comparators adapted to compare the feedback signal to a plurality of respective references, and the at least one analog voltage control signal is based, at least in part, on results of the comparison of the feedback signal to the plurality of respective references;
      the at least a second module comprises switching circuitry comprising internal capacitance; and
      the at least a second module is adapted to utilize the internal capacitance of the switching circuitry to generate the at least one analog voltage control signal.

13. The DC-DC voltage converter of claim 12, wherein the at least a second module is adapted to generate the at least one analog voltage control signal by at least:
   identifying a voltage region of a plurality of voltage regions to which the feedback signal corresponds; and
   generating the at least one analog voltage control signal based, at least in part, on the identified voltage region.

14. The DC-DC voltage converter of claim 13, wherein the plurality of voltage regions comprises three voltage regions.

15. The DC-DC voltage converter of claim 13, wherein the plurality of voltage regions comprises:
   a first voltage region in which the feedback signal corresponds to the output DC voltage being too high;
   a second voltage region in which the feedback signal corresponds to the output DC voltage being too low; and a third voltage region in which the feedback signal corresponds to the output DC voltage being at an acceptable level.

16. The DC-DC voltage converter of claim 13, wherein the plurality of voltage regions comprises five voltage regions.

17. The DC-DC voltage converter of claim 12, wherein all active components of the at least a second module are digital components.

18. The DC-DC voltage converter of claim 17, wherein the at least a second module comprises at least one passive component.

19. The DC-DC voltage converter of claim 17, wherein the feedback signal is an analog signal.

20. The DC-DC voltage converter of claim 12, further comprising a voltage divider circuit adapted to receive the output DC voltage and output the feedback signal.

21. The DC-DC voltage converter of claim 12, wherein the at least a first module comprises a low-dropout (LDO) converter.

22. The DC-DC voltage converter of claim 12, wherein the at least a first module comprises a pulse-width-modulator (PWM) converter.

* * * * *